United States Patent [19]
Dennis

[11] 3,717,316
[45] Feb. 20, 1973

[54] TAPE TRANSPORT CONTROL SYSTEM

[75] Inventor: Paul A. Dennis, Hermosa Beach, Calif.

[73] Assignee: Ex-Cell-O Corporation, Detroit, Mich.

[22] Filed: Oct. 28, 1970

[21] Appl. No.: 84,758

[52] U.S. Cl. ..................................242/190, 242/75.51
[51] Int. Cl. ..........................B65h 25/32, B65h 25/04
[58] Field of Search ......242/201, 202, 203, 190, 191, 242/186, 75.51, 75.5; 318/6

[56] References Cited

UNITED STATES PATENTS

| | | | |
|---|---|---|---|
| 3,565,366 | 2/1971 | Campbell | 242/190 |
| 3,523,655 | 8/1970 | Bevis | 242/190 |
| 2,990,484 | 1/1961 | Jones | 242/75.51 |

*Primary Examiner*—George F. Mautz
*Attorney*—Christie, Parker & Hale

[57] ABSTRACT

A control circuit for a reel-to-reel tape transport system for controlling the transfer of tape between the reels. The control circuit includes means for sensing the demand of tape during a tape transfer operation and providing an electrical signal corresponding thereto. The demand signal is compared with a feedback signal representative of the speed of the drive means for each of the storage reels and providing a comparison output signal of preselected magnitude and polarity. The comparison output signal is coupled to energize and individual reel drive through switchable power amplifiers. The power amplifiers are triggered from a "dead zone" trigger circuit coupled to be responsive to the comparison output signal for switching the power amplifiers from a fully conducting to a non-conducting condition. The "dead zone" trigger circuit is constructed and defined for providing a threshold comparison input signal level for defining the non-conductive state of the power amplifiers with changes in the comparison output signal level. The reel drives coast during the non-conductive states of the power amplifiers.

14 Claims, 6 Drawing Figures

INVENTOR.
PAUL A. DENNIS

BY

Christie, Parker & Hale
ATTORNEYS

PATENTED FEB 20 1973 3,717,316

SHEET 3 OF 4

TAPE TRANSPORT CONTROL SYSTEM

This invention relates to a tape transport control system and more particularly to an electronic servo system for controlling the transfer of tape from a tape reel upon demand.

Tape transport systems for transferring tape from one reel to another reel are well known in the art. Certain control systems have also been developed for controlling the reels of a tape transport system during the transfer of tape from one reel to another reel in accordance with the demand for tape required by the system. In general, such control systems employ linear servo control circuits to linearly control the motor driving the reels and operate on the reels of the transport system independently. One such prior art control system is described in the copending patent application bearing Ser. No. 772,779 and assigned to the same assignee as the present application, now U.S. Pat. No. 3,565,366.

The present application is an improvement in the type of servo control system disclosed in the aforementioned copending application in that it provides a relatively simple and economical proportional servo control circuit for transferring tape from one reel to another reel or from one reel to another location in accordance with the demand for tape and the type of tape transport system. The control circuit of the present invention is economical to operate in that the power circuits for the device motor are sequentially switched from a fully saturated or a fully conductive condition to a fully non-conductive condition in direct response to the desired velocity. As a result of this type of switching action the amount of heat that is dissipated by the power amplifiers is substantially reduced. With this type of action, the control is such that it continuously monitors and controls the speed or velocity of the motor in a fashion to allow the motor to coast during the intervals that it is rendered deenergized and continuously monitored to signal the necessity for re-energization to maintain the desired balance. This type of control is particularly adaptable to present day high inertia systems such as paper tape readers or tape spooling systems.

From a structural standpoint the present invention comprehends a tape transport system having a pair of spaced-apart reels for transporting tape between the reels. The tape transport system is employed with a paper tape reader for sensing the information recorded on the tape and which reader creates the demand for tape or signals the necessity for transferring tape from one reel to the other reel, or to another location. For this purpose, each reel is provided with a tape sensing arm over which the tape stored on the reels is passed for transfer between the reels. The tape sensing arms, in addition to functioning in a conventional tape guiding fashion, signal whether the supply of tape as called for by the tape reading station is either too short or too long and electrically signal this tape condition to the electronic servo system provided for controlling the motor to produce a balance between tape supply and demand. The servo system is operated in response to the tape condition signals in combination with a feedback signal from the drive motor which signals the actual velocity or speed that the reels are being driven. The servo system comprises a signal comparator/operational amplifier that compares the tape condition signal and the drive speed signal and provides a comparison output signal for operation by the remainder of the circuit to maintain the desired velocity and thereby provide a balance between supply and demand for the tape in the system. For this purpose a drive motor is connected with switching power amplifiers which are controlled by a triggering circuit which may be characterized as a "dead zone" trigger circuit. The dead zone trigger circuit is responsive to the comparison output signal and provides switching signals to the power amplifiers for certain preselected values of comparison output signals. The signals from the trigger circuit render the power amplifiers fully conductive to energize the drive motor for rotation in one direction or the other in accordance with the polarity of the comparison signal provided by the comparison circuit. The dead zone trigger is proportioned to define a threshold level of comparison signal and which signal must be exceeded before the power amplifiers are rendered conductive. During the interval that the comparison signal falls within the dead zone, the switching power amplifiers are maintained non-conductive, or are rendered non-conductive. The circuit is further defined such that the pulses derived from the power amplifiers have a relatively long time duration relative to the response time of the drive motor. This causes the drive motor to actually coast between the intervals that the power pulses are applied thereto and as a result of the continuous sensing of the drive motor velocity will cause the comparison signal to exceed the threshold level defined in the dead zone signal and render the power amplifier conductive once again in the effort to maintain the balance between the tape supply and the tape demand.

These and other features of the present invention may be more fully appreciated when considered in the light of the following specification and drawings, in which.

Figure 1:
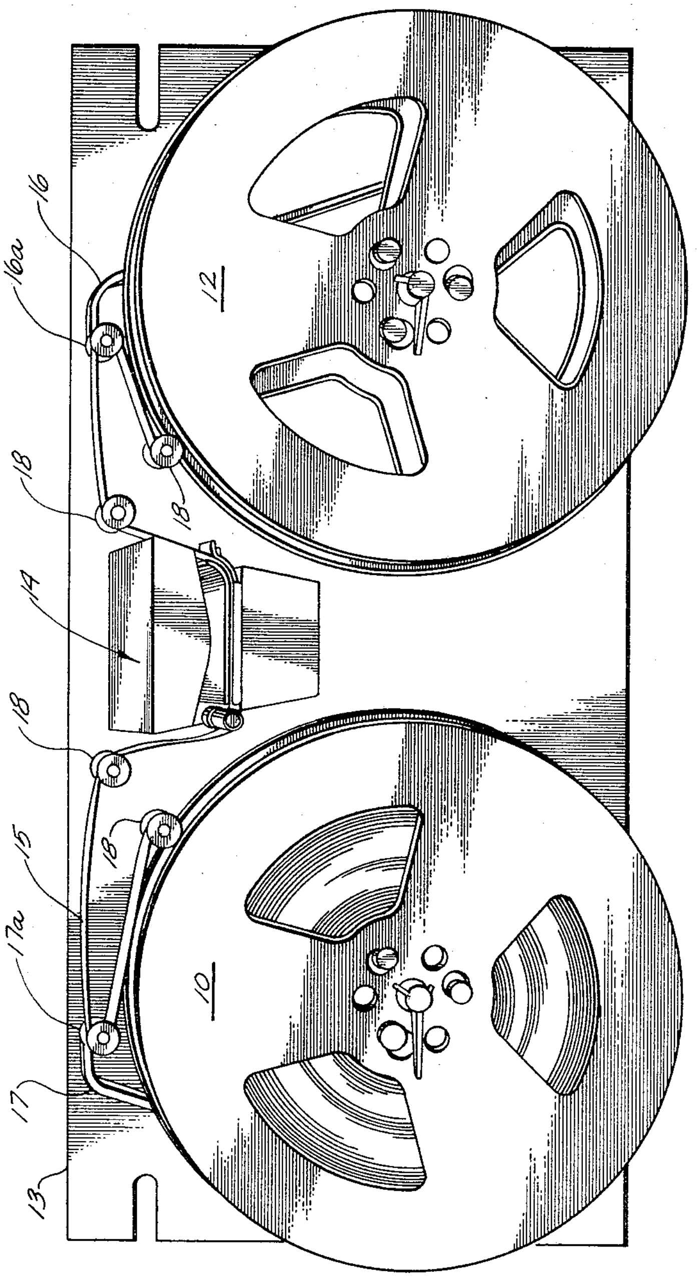
FIG. 1 is a front elevational view of a typical paper tape transport system embodying the invention.

Now referring to the drawings, the tape transport control system of the present invention will be examined in detail. It should be understood that although the present invention is incorporated in a tape transport system and will be described for paper tape reading purposes that it can be employed in a paper tape spooling system or may be used in any reel to reel transport system or in any system for transferring tape from one reel to another location without reference to the type of tape material being transferred or whether or not it is being transferred to another reel.

Referring to FIG. 1 wherein a typical tape transport system is illustrated comprising a pair of tape storage reels or spools 10 and 12 mounted on a panel 13 in a spaced-apart relationship with a tape reading system 14 mounted intermediate the reels 10 and 12. A paper tape 15 is illustrated as extending between the spools 10 and 12 and is guided through the reading system 14. The tape transport system includes the tape guiding arms 16 and 17 individually associated with the reels 12 and 10 for guiding the tape from reel to reel through the reading system 14 and for signaling the tape condition as will become more apparent hereinafter.

The tape transport system includes conventional tape guiding means typified by the guides 18 mounted on the panel 13 in a spaced-apart relationship and arranged for guiding the tape to and from the guide arms 16 and 17, the spools 10 and 12 and the reading system 14.

It should be noted that the reading system 14 includes drive means coupled to the paper tape 15 for advancing the tape through the reader in accordance with the reading direction for the tape. The drive motor associated with the reading system 14 is not illustrated and may be any conventional drive presently employed with such systems including reluctance type stepping motors. The important point to be kept in mind with respect to the drive motor for the reading system for the purposes of the present invention is that it creates a demand for the tape stored on the reels and which demand must be continuously satisfied to maintain desired rate of advancement of the tape through the reader. Stated differently, the velocity of the tape as it progresses through the reading system 14 must be accurately maintained in accordance with the demand created by the reader drive motor and therefore the speed of rotation of the reels in transferring the tape supply and take-up through the reader must be correctly controlled to allow for accurate reading of the information recorded on the paper tape 15. At this point it should also be noted that the control of the drive motors employed for driving the reels 10 and 12 are independently operated and controlled in response to the individual tape condition signals in combination with the motor speed signals responsive to the actual velocity of the drive motor shafts.

Figure 2:
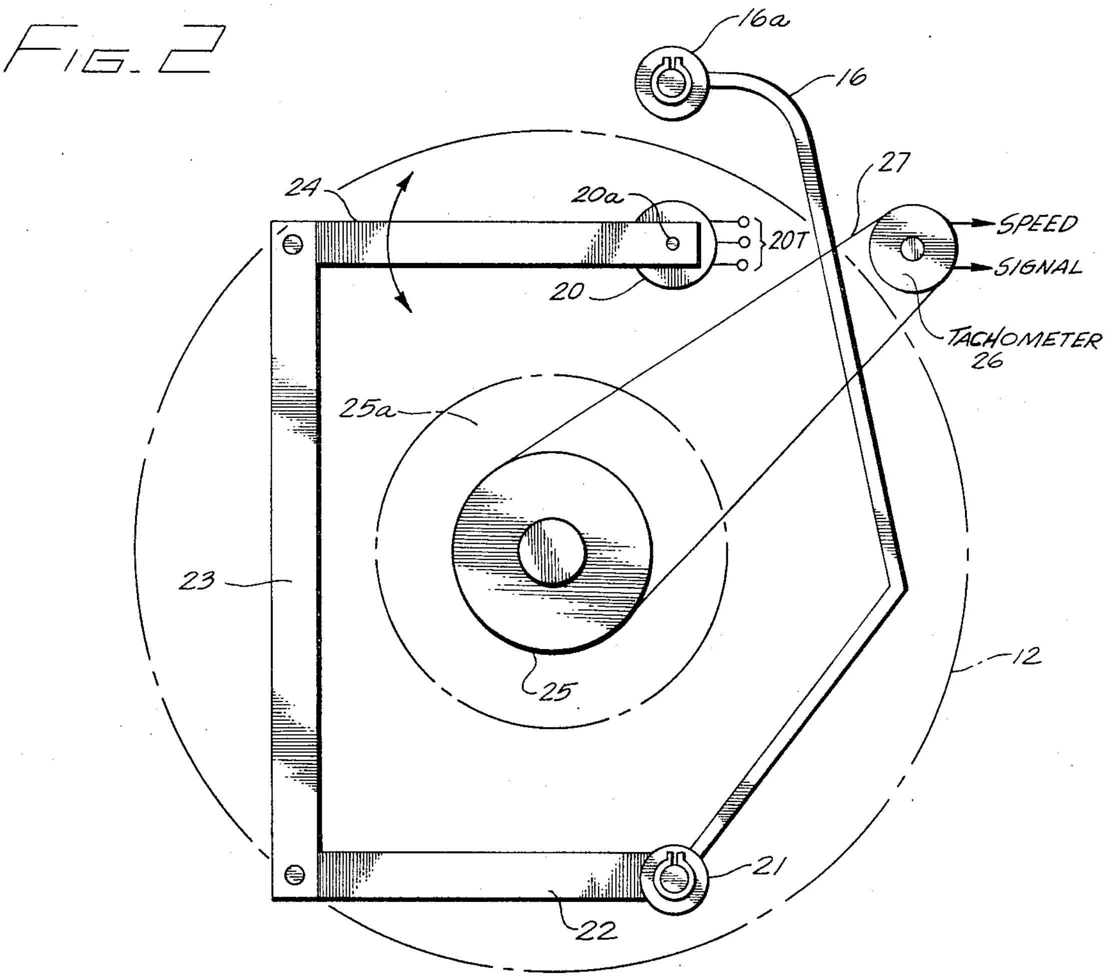
FIG. 2 is a partial view of one of the tape reel drive shafts showing the arrangement of the tape guiding arm for signaling the condition of the tape in the system and illustrating the reel in dotted outline.

As in prior art systems, the condition of the tape intermediate a tape spool and the reading system is signalled by a tape guide arm coupled with an electrical signal generator that is provided for this purpose. A tape guide arm 16 is illustrated in FIG. 2 as it is coupled to an electrical signal generator illustrated as a potentiometer 20 for providing the electrical signal representative of the tape condition of the tape associated with a particular reel or spool. The arrangement for signaling the tape condition for each of the spools 10 and 12 are identical and therefore only one such arrangement need be described. The system illustrated in FIG. 2 is that employed in combination with the tape guide arm 16 for the right hand spool as illustrated in FIG. 1. The tape guide arm 16 includes a tape guide 16*a* mounted at the free end thereof and the opposite end of the tape guide 16 is mounted with a bearing 21 to a movable arm 22 movably mounted with the bearing 21. The arrangement is such that with the movement of the tape guide arm 16 in response to the tape passing over the guide 16*a*, the arm 22 moves in response thereto. The movement of the arm 22 is transmitted to the operating arm 20*a* for the potentiometer 20 through a pair of fixed linkages 23 and 24 connected for transmitting the motion of the arm 22 to the potentiometer arm 20*a*. The rotation of the potentiometer 20, then, in response to the movements of the tape arm 16 produce electrical output signals from terminals 20*t* of the potentiometer indicative of the sensed tape condition. At this point, it should be recognized by those skilled in the art that although the potentiometer 20 is mounted in a spaced-apart relationship from the bearing 21 and the cooperating guide arm 16 that it may be mounted at the end of the guide arm that presently mounts the bearing 21. This will eliminate the linkages 22, 23 and 24 and cause the potentiometer to be directly coupled to and responsive to the guide arm 16.

Figure 4:
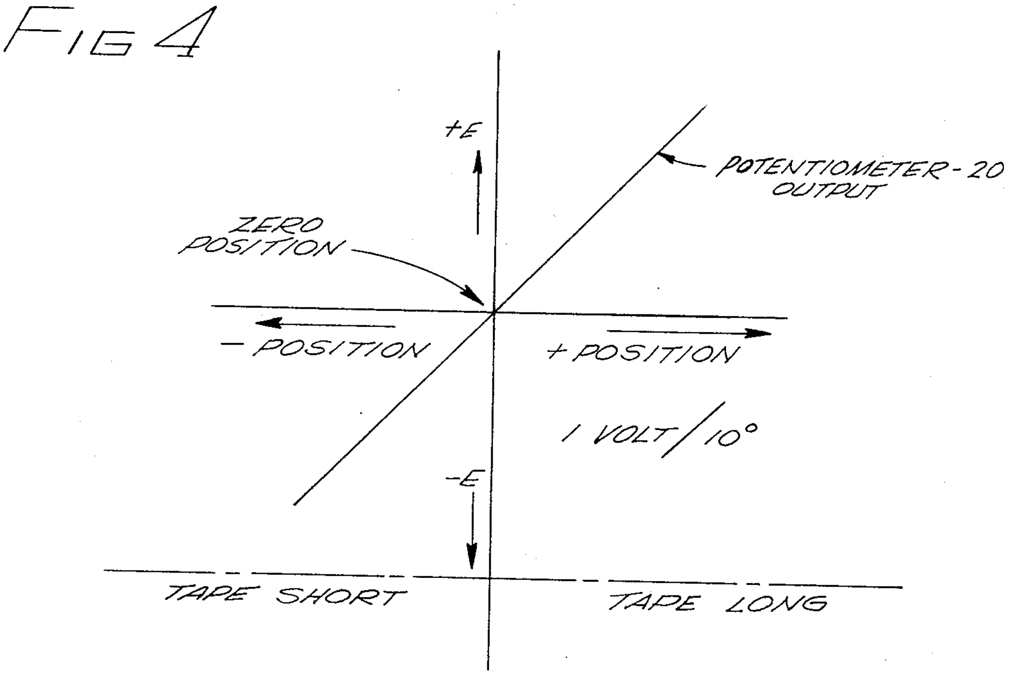
FIG. 4 is a graphical illustration of the voltage versus position output relationship of the signal provided by the signaling means associated with the tape guide arm of FIG. 2.
Figure 5:
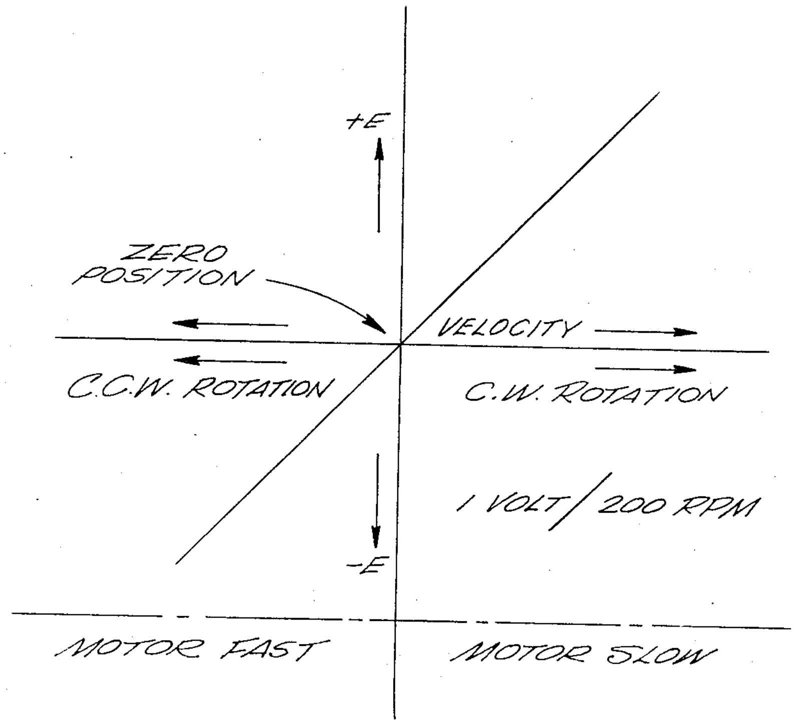
FIG. 5 is a graphical illustration of the voltage output versus drive motor speed for the feedback system for the drive motor as illustrated in FIG. 2.

The tape condition is considered as being either too long, too short or of the correct length and to provide the corresponding signals to the control system when the tape condition is short, the signal is to call for a higher velocity of the motor and a long tape signal is the signal for a lower velocity. The signals provided by the potentiometer 20 are illustrated in FIG. 4 wherein a relatively linear voltage relationship with the increased rotation of the potentiometer arm 20*a* in both directions is obtained from the potentiometer 20. The voltage output approximates one volt per 10° of rotation of the potentiometer arm 20*a*. The structural arrangement of FIG. 2 further illustrates the relationship of the drive shaft 25 with the tachometer 26 coupled thereto by means of a belt 27 for providing the feedback signal indicative of the velocity of the shaft 25. The velocity signal is provided from the tachometer 26. The linear relationship of the tachometer voltage output with the velocity is illustrated in FIG. 5. The linear relationship illustrated approximates 1 volt per 200 revolutions per minute.

Figure 3:
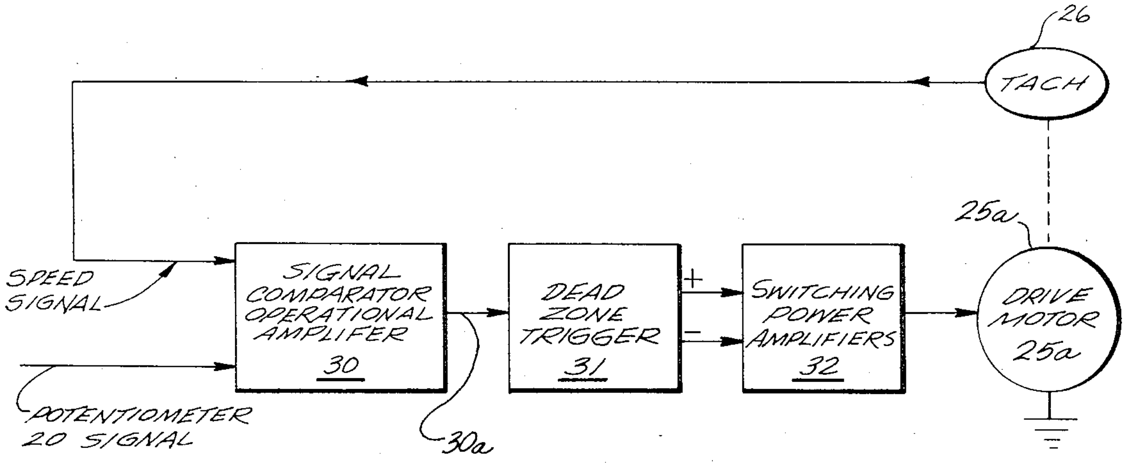
FIG. 3 is a block diagram of the control system for one of the drive motors for the tape transport system and embodying the present invention.

Prior to examining the proportional servo control system in detail the invention can be better appreciated if the general organization of the system as illustrated in FIG. 3 is first considered. For this purpose the single drive motor 25*a* employed with the right-hand spool 12 can be considered. The drive motor 25*a* arranged with the tachometer 26 to provide a feed back signal representative of the actual velocity of the drive motor 25*a*. The signal provided by the potentiometer 20 is illustrated as one of the input signals to a signal comparator and operational amplifier 30. The signal amplifier 30 is coupled to be responsive to the signals from the tachometer 26 and the potentiometer for comparing the two and providing an amplified version of the difference between these two signals at its output terminals 30*a*. This output signal is applied to a "dead zone" trigger circuit 31 coupled for controlling the conductive condition of the switching power amplifiers 32 arranged for energizing the drive motor 25*a*. The switching power amplifiers 32 are maintained in a fully conductive condition or a non-conductive condition for maintaining the drive motor energized or de-energized in accordance with the signals received from the dead zone trigger 31.

The dead zone trigger 31 is provided for defining a threshold signal level for the signals derived from the amplifier 30 that must be exceeded before the switching power amplifiers are rendered conductive. During the intervals that the comparison signal appearing on the output terminals 30*a* from the amplifier 30 falls within the defined dead zone level the switching power amplifiers 32 are maintained de-energized or non-conductive and during the intervals that the power amplifier 32 may be energized and the comparison signal falls within the dead zone, the amplifiers and the drive motor are returned to a de-energized condition. The polarity of the signal from the amplifier 30 also defines the polarity of the power pulses applied to the drive motor 25*a* for controlling the direction of rotation of the motor 25*a*.

Figure 6:
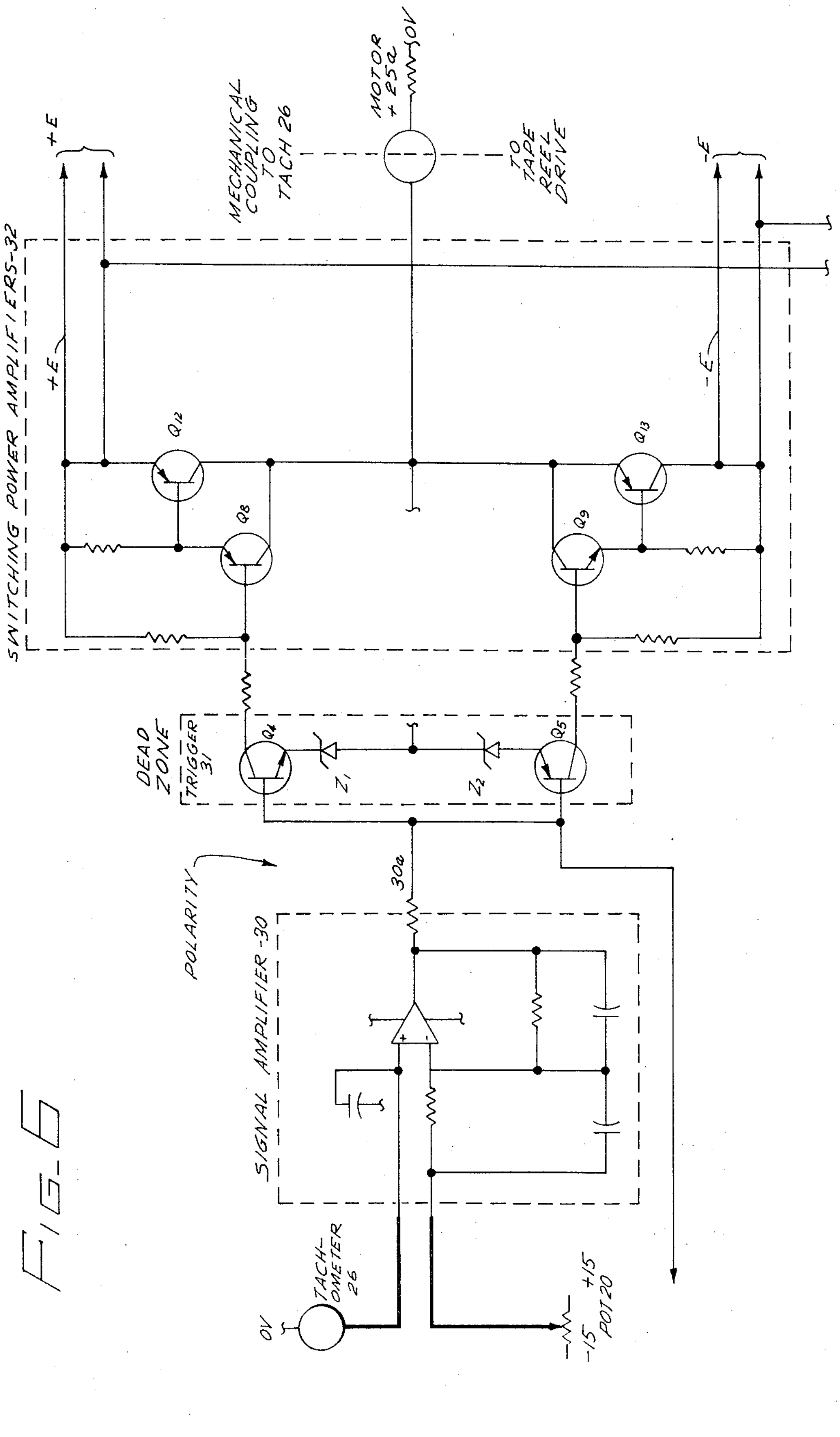
FIG. 6 is a schematic circuit diagram of the drive control system in accordance with the block diagram of FIG. 3.

Now referring to FIG. 6, the detailed structure of the control system of the present invention can be examined. The signal amplifier 30 is illustrated as a conventional operational amplifier for receiving the signals from the tachometer 26 and the potentiometer 20 and providing a comparison output signal in accordance with the relative values of the tachometer output voltage and sensed condition of tape signal from the potentiometer 20. The operational amplifier 30 is of a conventional construction and in addition to the comparison function, may provide an amplification factor of eight. In addition to the difference signal derived from the amplifier 30 the signal will have a polarity representative of the relative magnitudes of the two signals for application to the dead zone trigger 31. The dead zone trigger 31 comprises a pair of transistor switching circuits identified as the transistors Q4 and Q5 that are both directly coupled to the output terminals 30*a* of the signal amplifier 30. The transistors Q4 and Q5 are coupled to the terminals 30*a* directly through their base electrodes. The transistors Q4 and Q5 are arranged in a reverse polarity condition with each emitter circuit for the transistors being connected to a reference potential source through a pair of Zener diodes Z1 and Z2. The Zener diode Z1 is connected with its cathode electrode connected to the emitter electrode for the transistor Q4 and its anode electrode connected to the source of reference potential with the cathode electrode for the Zener diode Z2. The anode electrode for the Zener diode Z2 is connected directly to the emitter electrode for the transistor Q5. The output signals, then, from the transistors Q4 and Q5 are derived from their respective collector electrodes which are each directly coupled to the switching power amplifiers 32. It should be recognized that in accordance with the polarity of the signals appearing on terminal 30*a* that either one of the transistors Q4 or Q5 may be rendered conductive. These transistors are rendered conductive in the event that the amplitude on the terminal 30*a* is sufficient to break down either the Zener diode Z1 or Z2 and render it conductive and provide a conductive circuit through the associated transistor Q4 or Q5.

The switching power amplifiers 32 comprise two pairs of power transistor amplifiers for exciting or energizing the motor 25*a* in response to signals provided by the dead zone trigger 31. One pair of power amplifiers is arranged in cascade circuit relationship as illustrated and comprises the transistors Q8 and Q12 having their emitter electrodes connected to a positive source of potential. The transistor Q8 is coupled to be responsive to the output signal from the transistor Q4 of the dead zone trigger 31. The signal provided from transistor Q8 is coupled to transistor Q12 and by means of its collector electrode it excites the motor 25*a*. In the same fashion, a pair of transistors Q9 and Q13 are coupled to a negative voltage source and to the transistor Q5 of the dead zone trigger 31 for energizing the motor 25*a* in a direction of rotation reverse from that provided by transistors Q8 and Q12. This output signal is coupled to the drive motor 25*a* in common with the signal from the transistor Q12.

With the above structure in mind the detailed operation of the control system of the present invention can now be described. It will be assumed that the tape transport system is put into operation by causing the motor associated with the reading system 14 to become energized. It will then be assumed that the paper tape 15 will be transferred from left-hand reel 10 onto right-hand reel 12 for effecting the reading operation at the reading station 14. During this operation, then, the tape 15 will be transferred from the storage reel 10 to the take-up reel 12. When the system is at rest, each of the tape arms 16 and 17 will assume central positions as illustrated in FIG. 1. Since the tension on the tape is maintained substantially constant, the guides 16*a* and 17*a* will move to the left or right of the central position in accordance with the relative velocities imparted to the tape 15 by the reading system drive motor and the reel drive motors. When the system is at rest, the signals derived from the potentiometer 20 are at the zero voltage level and the potentiometers are considered as being in their "zero" or at rest position. At this same time, the tachometer 26 is at rest and so its output voltage is at the zero voltage level. With the actuation of the drive motor for the reading system 14, the tape 15 is driven from the left to the right so a signal is derived from the potentiometer 20 associated with the tape arms 16 and 17 indicative of the demand created by the reading system 14. At this time the drive motors for the reels 10 and 12 are at rest and therefore no tachometer output signal is provided. Initially, then, the comparison output signal falls within the "dead zone" level and the condition of the reel drive motors remains unchanged. At the time interval that the signal derived from the amplifier 30 falls outside the dead zone trigger 31 threshold level, the power amplifiers 32 are switched into their conductive condition thereby exciting the associated drive motors. The motor or motors will be fully energized. This condition exists until the signal derived from the signal amplifier 30 once again falls within the dead zone level of the trigger 31 and the drive motor is rendered non-conductive. When the drive motor is de-energized it coasts and slowly reduces its velocity continuously providing a feedback signal of decreasing amplitude. This tends to maintain the drive velocity at the desired velocity. With the decreasing drive velocity, the tape signal decreases until the combination provides a comparison output signal that exceeds the threshold level of the "dead zone" trigger to once again excite the reel drive motor. This action continues whereby the servo system continuously responds to maintain a balance between the supply and demand for tape. It should be noted that the power pulses provided to the drive motors are of a long time duration relative to the response time of the motors. Also, for the servo system to be at rest, friction of the drive motor is required. This friction may be provided by the motor bearings or a separate braking mechanism.

What is claimed is:

1. In a tape transport system including
at least a single rotatable tape storage reel having tape extending therefrom;
means for driving the storage reel to transfer tape therefrom;
means coupled to the tape extending from the storage reel for creating a demand to transfer tape from the reel;
means for sensing the demand of tape from the reel and providing an electrical signal corresponding thereto;
means for sensing the speed of the driving means and providing an electrical signal corresponding thereto;
comparison circuit means for comparing the demand and speed signals and providing a drive control signal to the drive means corresponding to the comparison of the signals to maintain a balance between tape supply and demand, said comparison circuit means maintaining the balance by successively switching the drive means between a fully energized condition and fully de-energized position whereby the motor actually coasts during the de-energized time intervals.

2. In a tape transport system as defined in claim 1 wherein the tape demand sensing means includes a movable tape guiding arm movable in accordance with the demand created for the tape and coupled to electrical signal generating means for providing varying electrical signals in accordance with the arm movements.

3. In a tape transport system as defined in claim 2 wherein the electrical signal generating means is a potentiometer coupled to the tape guiding arm.

4. In a tape transport system as defined in claim 2 wherein the speed sensing means is a tachometer coupled to the drive means.

5. In a tape transport system as defined in claim 2 wherein the drive means includes friction means for maintaining the drive means at rest.

6. In a tape transport system for transferring tape from a storage reel including
at least a single rotatable tape storage reel having tape extending therefrom;
means for driving the storage reel to transfer tape therefrom,
means for sensing the demand of tape for transferring tape from said reel and providing an electrical signal corresponding thereto;
means for providing a feedback signal from said drive means representative of the speed thereof;
means for comparing the feedback signal and the signal from said sensing means and providing a comparison control signal corresponding thereto; and
circuit means connected to be responsive to the output control signals from the comparing means for applying a speed control signal to said drive means for energizing the drive means for rotation in a direction in accordance with the sensed tape demand and including time intervals of non-energization of the drive means in response to comparison signals of a preselected magnitude.

7. In a reel to reel tape transport system for transferring tape from one storage reel to another storage reel including
a pair of rotatable tape storage reels mounted in a spaced apart relationship and having tape extending between the reels;
means for driving each of the storage reels to transfer tape between the reels upon demand;
means coupled to the tape and arranged intermediate the reels for creating a demand to transfer tape from one reel to the other in accordance with the created demand;
means coupled to the tape extending between the reels for sensing the demand for tape as called for by the demand creating means and providing an electrical signal corresponding thereto;
means coupled to the drive means for providing an electrical signal corresponding to the actual speed of the drive means;
drive control means including comparison means coupled to be responsive to the electrical signals representative of tape demand and drive means speed for maintaining a balance between supply and demand as the tape is transferred from reel to reel and to provide a control signal in accordance with the comparison of the two, said control means including "dead zone" circuit means for defining a zone for maintaining the drive means de-energized for preselected values of the comparison of the tape demand and drive speeds whereby the drive means coasts during the thus defined dead zones and is energized at other time intervals when the comparison signal exceeds the thus defined "dead zone" to thereby cause the drive means to be successively switched on and off by the control circuit.

8. In a reel tape transport system as defined in claim 7 wherein the dead zone circuit means includes means responsive to the comparison signal for providing a signal outside of the "dead zone" representative of the required direction of rotation of the drive means for maintaining the balance between tape demand and supply.

9. Apparatus for transferring tape from one tape storage location to another tape storage location including
first and second storage reels mounted in a preselected spaced apart relationship for transferring tape from one of the reels to the other reel and having tape extending between the reels;
means for sensing the demand of tape from one storage reel to the other storage reel and providing an electrical signal corresponding thereto;
means for driving each of the storage reels;
individual circuit means for sensing the speed of each of the drive means and providing electrical output signals corresponding thereto;
individual circuit means for comparing the tape demand signals and the drive speed signals and providing a comparison output signal of preselected magnitude and polarity;

individual switchable power amplifying means connected for energizing an individual one of the drive means in a direction in accordance with the polarity of the corresponding comparison output signal; and individual trigger circuit means coupled to be responsive to the corresponding comparison signal for conductively switching the power amplifiers from a fully conducting to a non-conducting condition in response to the output signal from the trigger circuit means, the trigger circuit means including circuit means for defining a threshold comparison signal level for defining the non-conductive state of the power amplifiers.

10. Apparatus as defined in claim 9 wherein the trigger circuit means comprises transistor switching circuit means including Zener diode means coupled thereto for maintaining the circuit means in a non-conductive condition until the comparison output signal is of an amplitude to render the Zener diodes conductive thereby defining the threshold signal level to be exceeded whereby a dead zone is defined.

11. Apparatus as defined in claim 10 wherein the comparison amplifier operates on the speed signal and the tape demand signal to maintain them in balance thereby providing an output comparison signal that traverses through the dead zone thereby causing the power amplifiers to become de-energized and the drive means to coast when the comparison signal falls within the dead zone.

12. Apparatus as defined in claim 11 wherein said sensing means includes a swingable tape guide arm mounted adjacent each of the reels and engaging the tape extending between the reels to be swingable in response to the changes in tape demand, and electrical signalling means associated with each of the guide arms and coupled to be responsive to the positions of the arms for providing electrical signals corresponding thereto.

13. Apparatus as defined in claim 12 including tachometer means for providing the speed feedback signal.

14. Apparatus as defined in claim 13 wherein said electrical signalling means comprises individual potentiometer means having a movable arm for each guide arm and means coupled between each of the guide arms and the individual potentiometer arms for changing the position of the latter arms to correspond to the position of the individual guide arms thereby providing the desired demand signals.

* * * * *

PO-1050
(5/69)

UNITED STATES PATENT OFFICE
CERTIFICATE OF CORRECTION

Patent No. 3,717,316 Dated Feb. 20, 1973

Inventor(s) Paul A. Dennis

It is certified that error appears in the above-identified patent and that said Letters Patent are hereby corrected as shown below:

In the Abstract, line 11 reads "and, should read --an--.

Col. 1, line 29, reads "device", should read --drive--.

Col. 4, line 48, insert --is-- after "25a".

In the drawings, Sheet 4, Figure 6, the internal arrangement of transistor Q13 should be exactly the same as the internal arrangement of transistor Q9.

Signed and sealed this 13th day of August 1974.

(SEAL)
Attest:

McCOY M. GIBSON, JR.
Attesting Officer

C. MARSHALL DANN
Commissioner of Patents